R. H. RUDOLPH.
LEATHER STITCHING MACHINE.
APPLICATION FILED MAY 22, 1919.
1,352,222.
Patented Sept. 7, 1920.
7 SHEETS—SHEET 2.
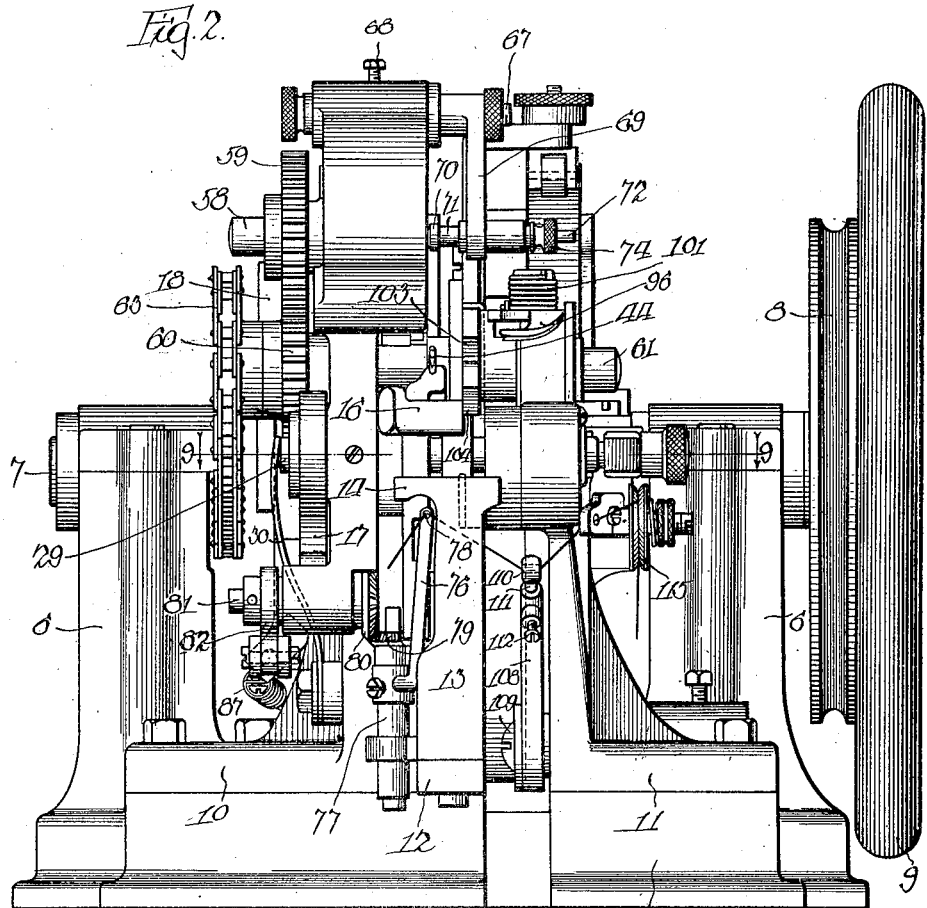
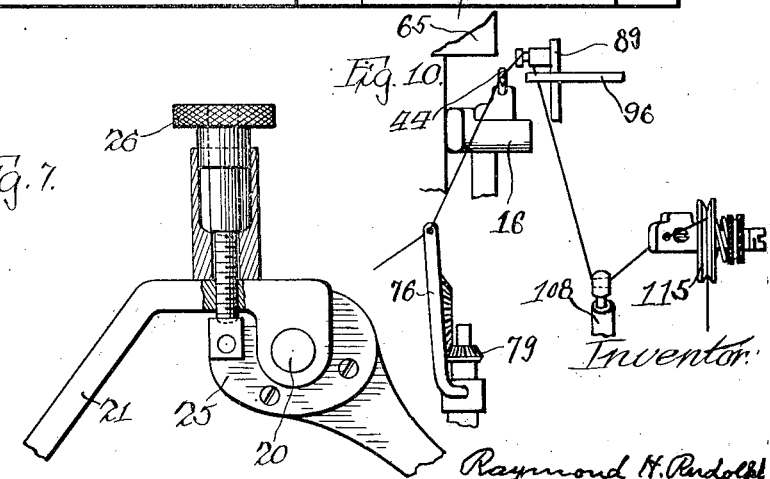

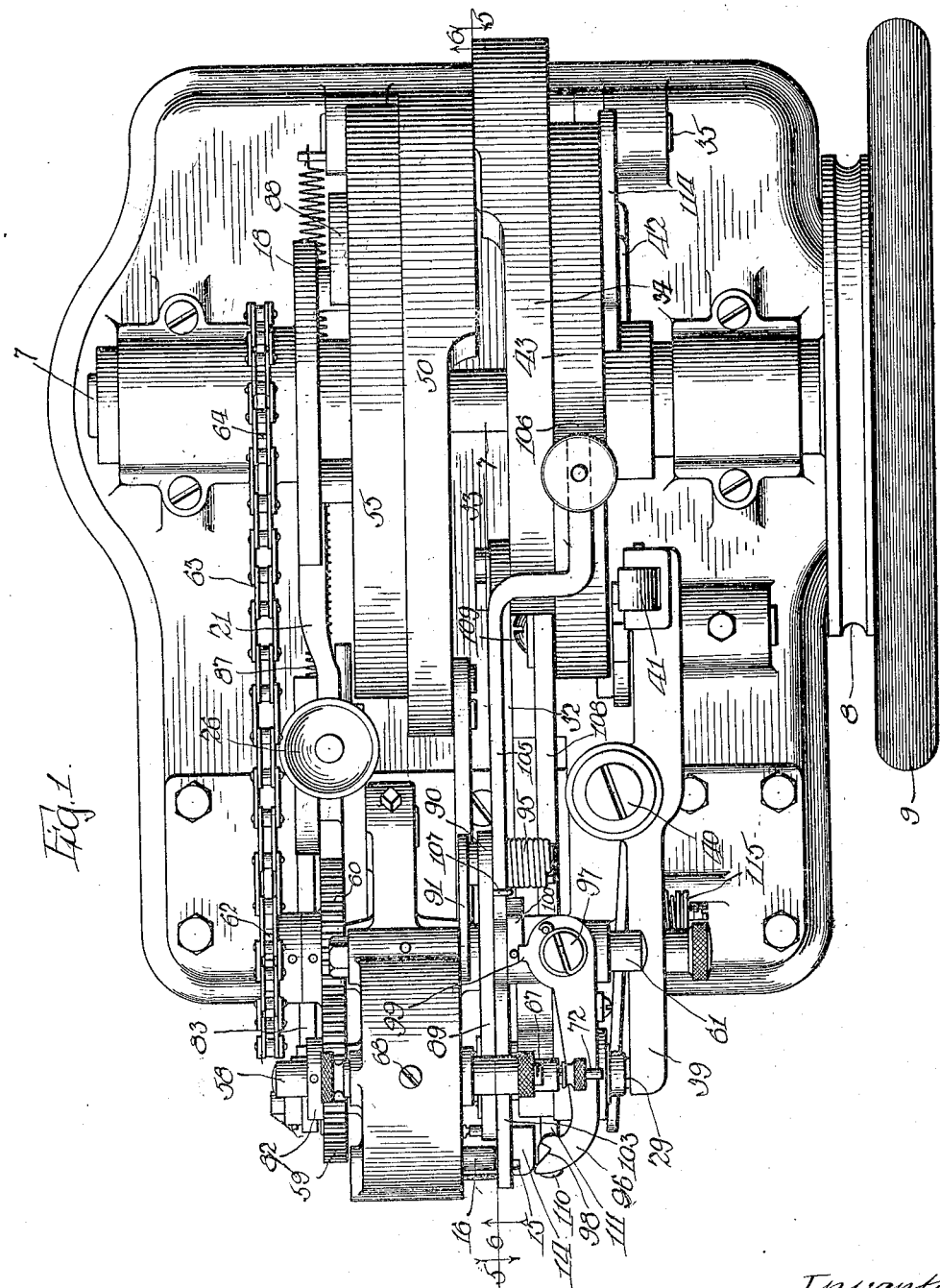

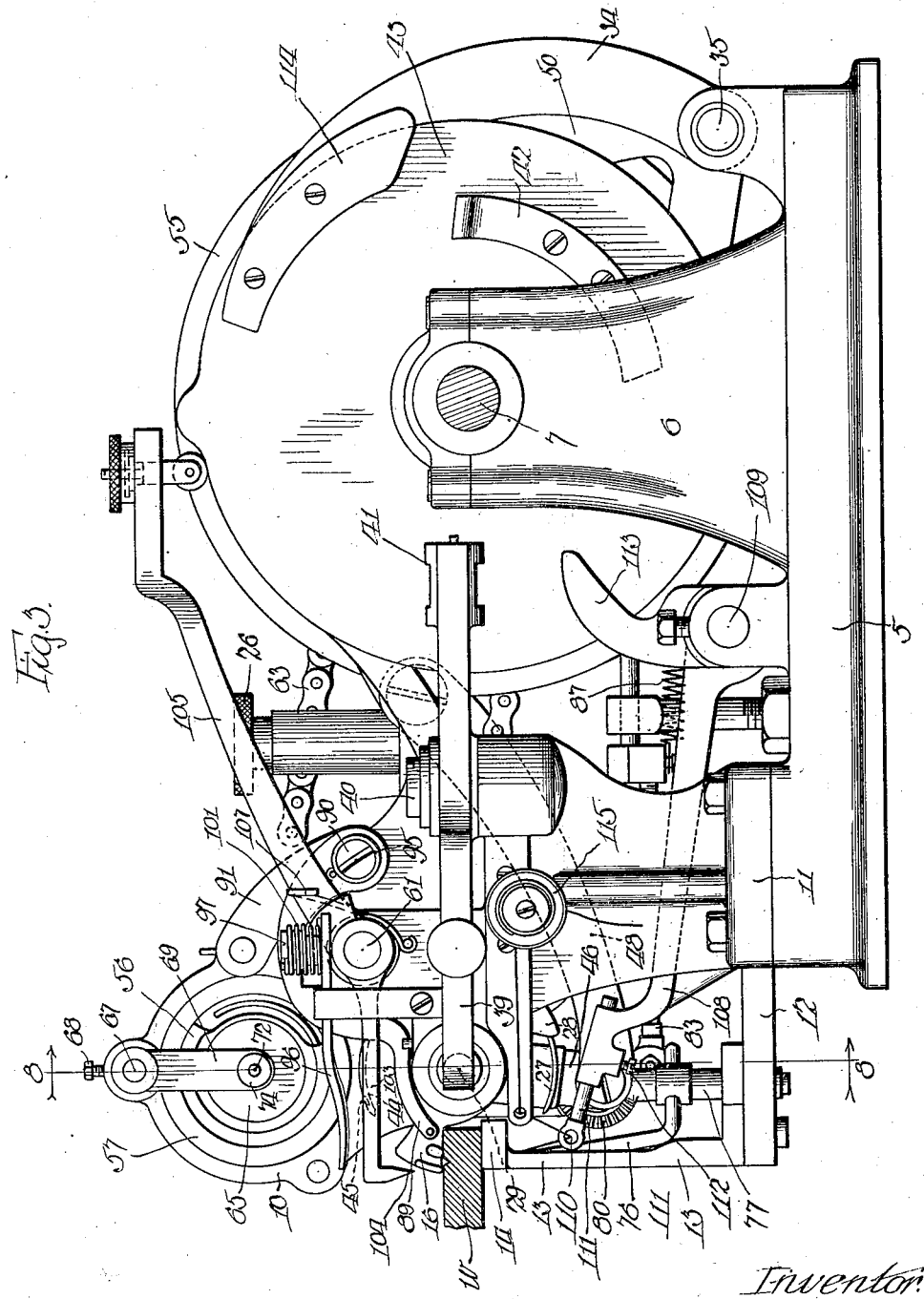

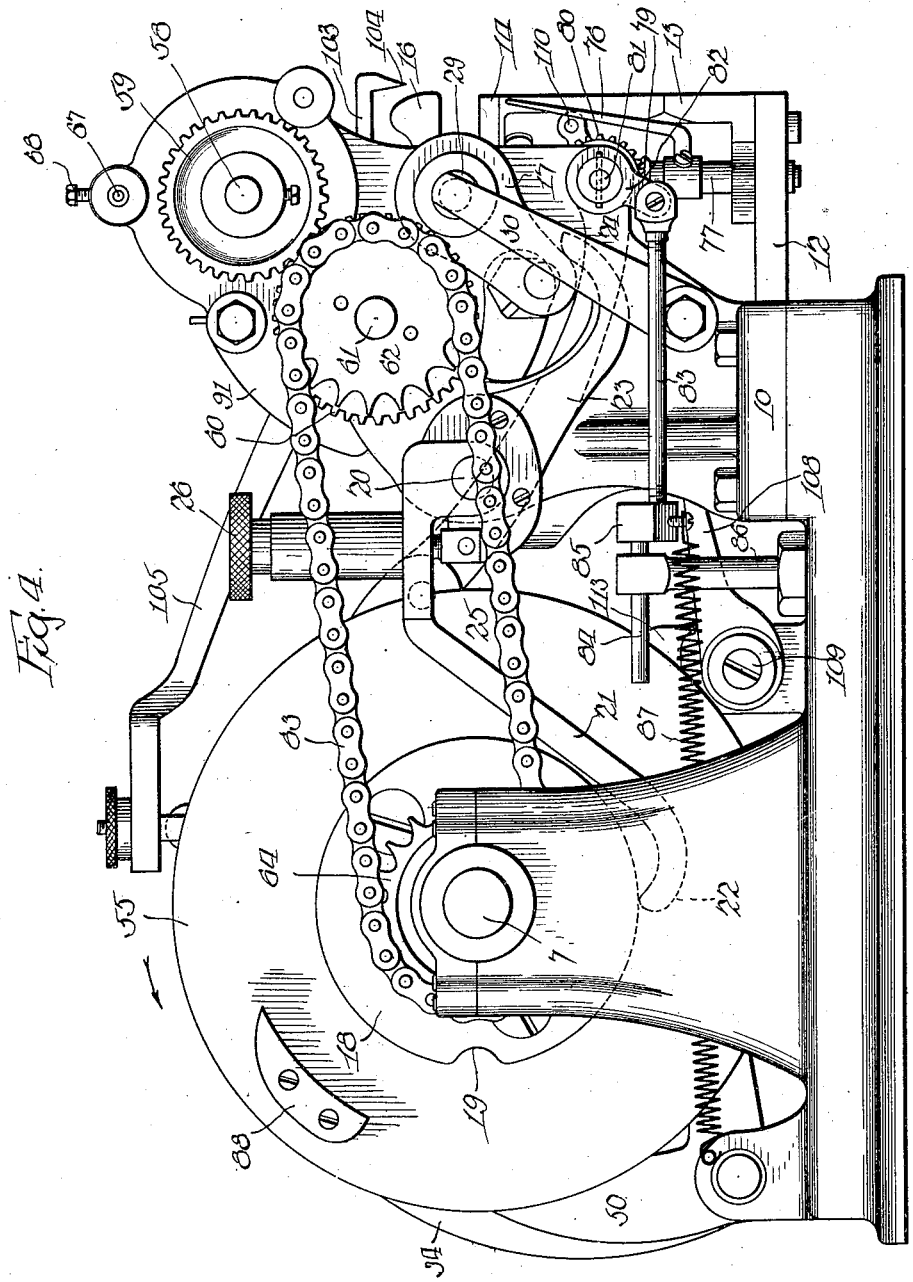

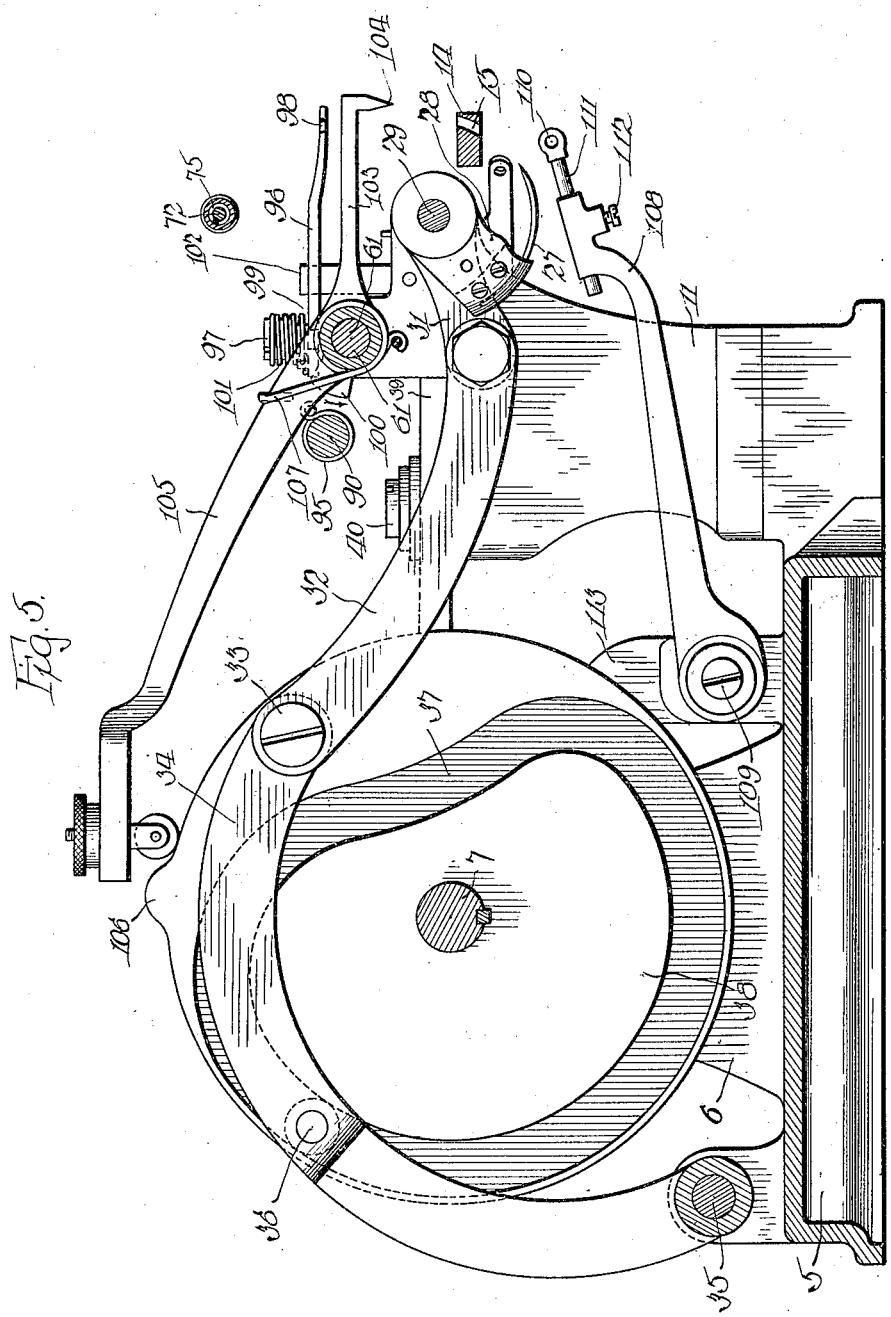

R. H. RUDOLPH.
LEATHER STITCHING MACHINE.
APPLICATION FILED MAY 22, 1919.

1,352,222.

Patented Sept. 7, 1920.
7 SHEETS—SHEET 6.

Witness:

Inventor:
Raymond H. Rudolph
By Chas. C. Tillman
Atty.

R. H. RUDOLPH.
LEATHER STITCHING MACHINE.
APPLICATION FILED MAY 22, 1919.
1,352,222.
Patented Sept. 7, 1920.
7 SHEETS—SHEET 7.
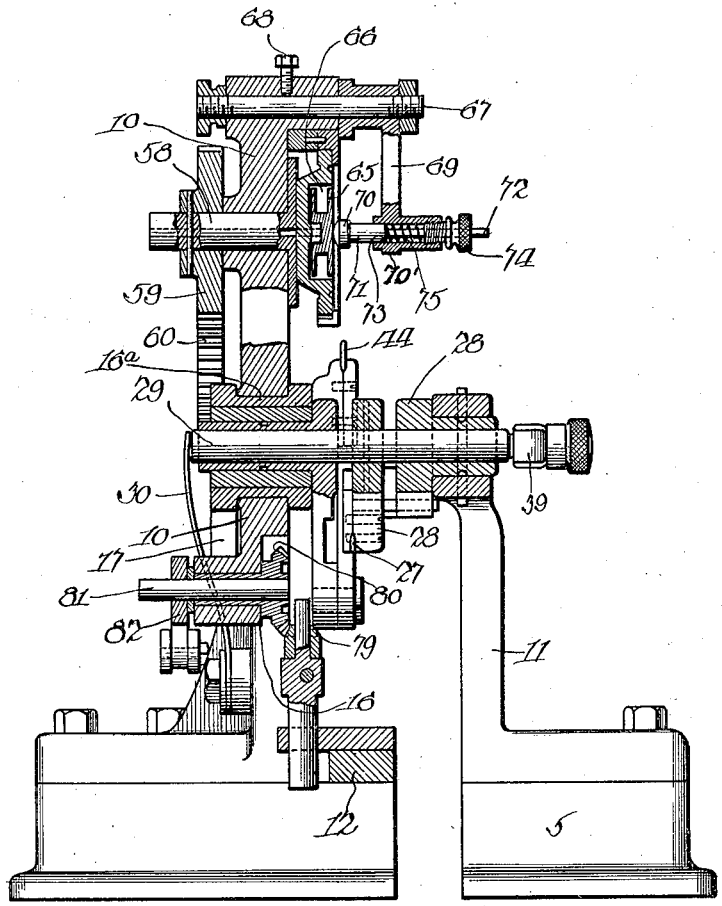
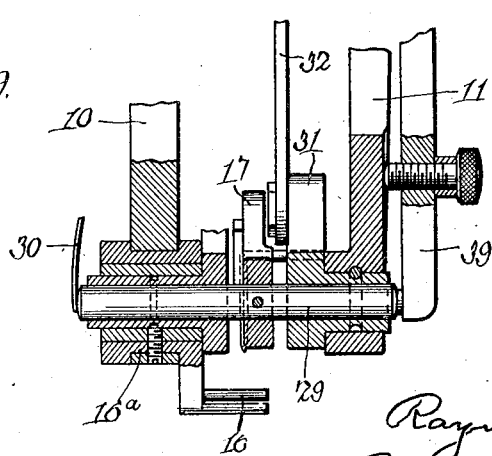

UNITED STATES PATENT OFFICE.

RAYMOND H. RUDOLPH, OF ELGIN, ILLINOIS, ASSIGNOR OF ONE-HALF TO CHARLES FRIEDMAN, OF CHICAGO, ILLINOIS.

LEATHER-STITCHING MACHINE.

1,352,222.    Specification of Letters Patent.    Patented Sept. 7, 1920.

Application filed May 22, 1919. Serial No. 298,969.

*To all whom it may concern:*

Be it known that I, RAYMOND H. RUDOLPH, a citizen of the United States, residing at the city of Elgin, in the county of Kane and State of Illinois, have invented certain new and useful Improvements in Leather-Stitching Machines, of which the following is a specification.

This invention relates to new and useful improvements in leather stitching machines such as are used in the manufacture and repair of shoes, harness, etc., and embodies improvements over my former Patent, #1,295,070, issued February 18, 1919.

One of the principal objects of this invention is to provide a machine for the purpose set forth which is extremely simple in construction, positive in operation, and which is composed of a minimum number of parts.

Another important object of the invention is to provide a bobbin case with a tensioning device therefor, which is so constructed as to permit the same being moved to render the bobbin accessible.

Another object of the invention is to provide an intermittently actuated presser foot, the actuating means therefor embodying a very simple construction, whereby a varying amount of pressure may be readily applied to the foot while work is disposed thereunder.

A further object of the invention is to provide a shuttle which coöperates with the under thread, the shuttle rotating about an axis arranged in a plane at right angles to the direction of feed of the work.

A still further object of the invention is to provide a pair of thread manipulating implements which operate in succession to carry the lower thread from the needle into a position whereby it will be engaged by the shuttle.

Another important object of the invention is to provide an intermittently actuated device for indenting the upper surface of the work, whereby a channel will be formed for receiving the upper thread.

A still further object of the invention is to provide an intermittently actuated lower thread positioning device for causing said thread to be positioned relative to the needle, whereby said needle will, with certainty, engage the thread.

These and other objects will in part be obvious, and will hereinafter be more fully explained.

In the drawings, which show by way of illustration, one embodiment of my invention, Figure 1 is a top plan view of the machine.

Fig. 2 is a front elevation thereof.

Fig. 3 is a side elevation of the right-hand side of the machine, the driving pulley being removed and the main shaft shown in section.

Fig. 4 is a side elevation of the left-hand side of the machine.

Fig. 5 is a vertical sectional view taken on the line 5—5 of Fig. 1.

Fig. 7 is a detail sectional view of the presser foot adjustment.

Fig. 8 is a detail vertical view taken on the line 8—8 of Fig. 3.

Fig. 9 is a plan sectional view taken on line 9—9 of Fig. 2, and

Fig. 10 is a fragmentary view in elevation showing the thread loop distended for the entrance of the shuttle.

Figure 6:
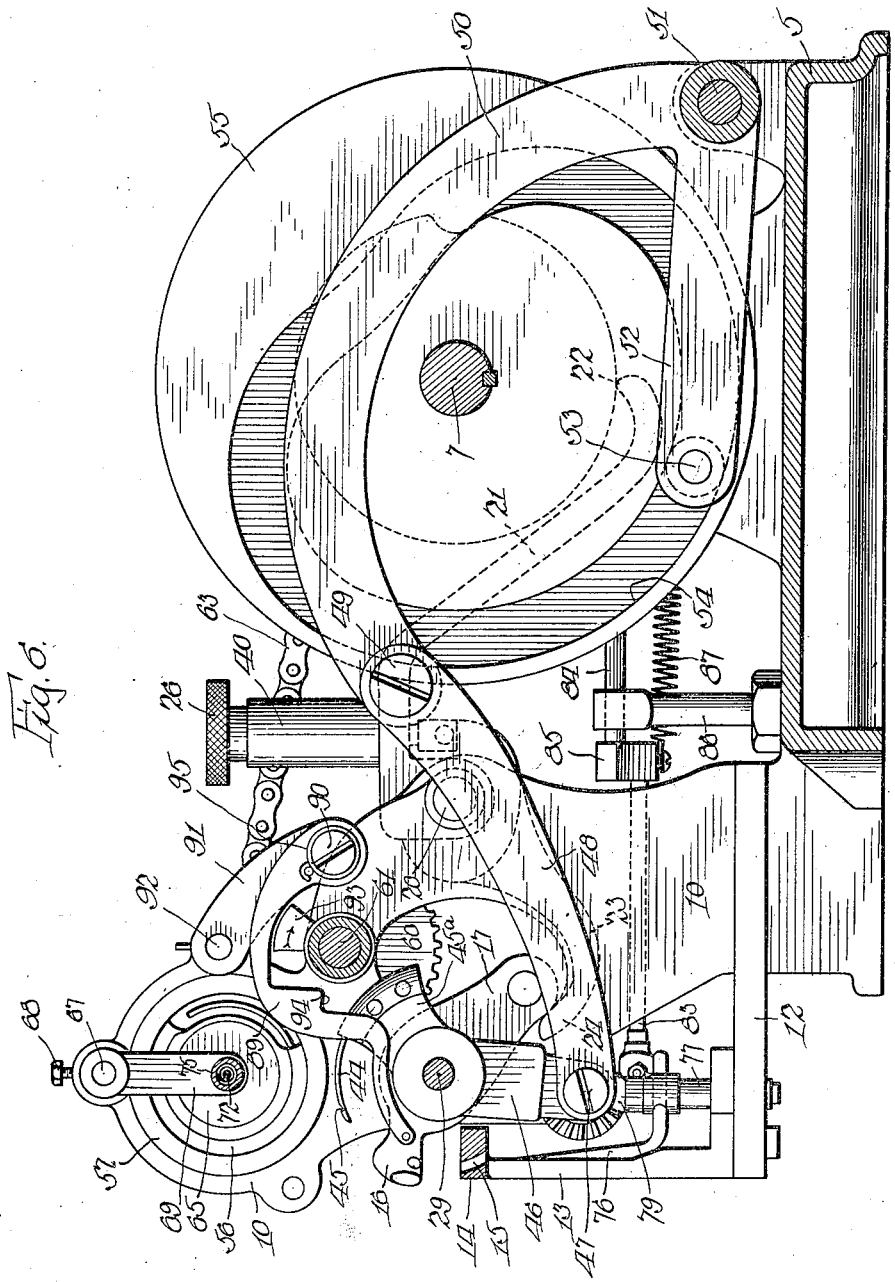
Fig. 6 is a longitudinal sectional view taken on the line 6—6 of Fig. 1.

Referring to the drawings, the machine includes a base 5, and extending upwardly from the rear portion thereof are spaced standards 6—6, in which is journaled the main driving shaft 7, said shaft being driven through the medium of a belt wheel 8, to which is attached a hand wheel 9. Bolted to the front end of the base 5 are spaced angle brackets 10 and 11 respectively. Secured to the bracket 10 and extending forwardly therefrom, is an arm 12, and to the front end of this arm is attached an upwardly extending work supporting arm 13, which supports a horizontally disposed throat plate 14 at its upper end. This throat plate is formed with an elongated slot 15. The work is fed across the throat plate 14 in a direction parallel with the axis of the main shaft 7, and consequently the slot 15 has its major axis arranged parallel with said shaft 7.

Coöperating with the work which is supported on the throat plate, is a presser foot 16. This presser foot is in the nature of a rocker arm. This arm is connected to a second arm 17 by an integral hub 16ª, which is journaled in the bracket 10, as clearly shown in Fig. 8. It will thus be seen that any upward movement at the lower end of the arm 17 will cause the presser foot 16 to move downwardly on to the work. In order to intermittently operate this presser foot, I have provided a cam disk 18, having a small cam notch 19 in its periphery, the entire periphery, with the exception of the cam notch 19, being concentrically arranged with respect to the main shaft 7, to which it is attached. Journaled in the bracket 10, between the arm 17 of the presser foot and the main shaft 7, is a pivot pin 20. An arm 21 has one end journaled on the pivot 20, and the other end 22 extending under and normally engaging with the periphery of said cam disk 18. An arm 23 is also journaled on the pivot 20, and one end 24 thereof extends under and slidingly engages the lower end portion of the arm 17. The other end 25 of this arm 23 extends beyond the pivot 20.

An adjusting screw 26 is threaded into the arm 21 at a point directly over the end 25 of the arm 23. It will thus be seen that by adjusting the screw 26 downwardly, the arm 23 will cause the rock arm 17 to be moved upwardly to force the presser foot downwardly on to the work, this movement being obtained by forcing the end 25 of the arm 23 away from the arm 21. This, in turn, forces the end 22 of the arm 21 to engage the periphery of the cam disk 18. It will thus be seen that by means of this adjusting screw 26, a varying pressure may be imparted to the presser foot. It will also be noted at this time, that once during each cycle the cam notch 19 will coincide with the up-turned end 22 of said arm 21, and thereby relieve the pressure on said arm 21 and consequently remove the pressure from the presser foot.

From the foregoing, it will be seen that the presser foot 16, the hub 16ª, and the arm 17 all together constitute a rocking frame. It will also be noted that the arms 21 and 23 are disposed between the arms 17 of the rocking frame and the actuating cam 18. The arms 21 and 23 constitute in effect a toggle connection.

In the drawings, I have designated the leather or other work being sewed by the reference letter W.

Coöperating with the work support and presser foot is an awl 27, see particularly Fig. 5. This awl is carried by an arm 28, which is rigidly secured to a transverse shaft 29. One end of this shaft is disposed within the hub 16ª. The arm 28 is a reciprocating arm and the awl moves from a point below the work support upwardly through the slot 15 thereof, so as to pierce the work W. The shaft 29 is then shifted endwise against the tension of the spring 30, so as to cause the awl to positively feed the work a distance equal to the length of one stitch.

It will be understood, of course, that when this feeding action by the awl occurs, the pressure of the presser foot has been released. In order to oscillate the awl about its shaft, said shaft is provided with a rearwardly extending rock arm 31, which is pivotally connected to one end of a link 32. The other end of this link is pivotally connected, as at 33, to one end of a roller arm 34, which is fulcrumed at 35 to the base 5. The arm 34 extends rearwardly above the main shaft 7 and thence downwardly to its pivot 35. A roller 36 is carried by the arm 34 and operates in a cam groove 37 formed in a cam disk 38 fixed to the main shaft 7. The cam groove 37 is so shaped that the awl will be held in its retracted or inoperative position for the greater portion of each cycle. It will be noted that the shaft 29 and the awl are disposed in rear of the work support. The cam groove 37 is so shaped as to cause the awl to remain in the work during the feeding action thereof.

In order to shift the shaft 29 endwise against the tension of the spring 30, I have provided a lever 39, which is fulcrumed on the bracket 11 by the screw 40. This lever extends rearwardly and the screw 40 is disposed in rear of the shaft 29. The other end of the lever carries a roller 41 which is intermittently engaged by the cam plate 42, fixedly mounted on the side face of the cam disk 43. It will thus be seen that as the cam disk 43 rotates, the cam plate 42 will, during each revolution, engage the roller 41, causing the lever 39 to swing about its pivot 40, and thereby move the shaft 29 endwise against the spring 30, this movement, as before explained, occurring while the awl is in the work, and while the pressure of the presser foot has been released. The cam plate 42 is of such a length that the roller 41 will become disengaged therefrom as soon as the feeding stroke of the awl has been completed, thereby permitting the spring 30 to return the shaft 29 to its original position.

After the awl has performed its feeding action and has withdrawn, it leaves an opening in the work in a position to be entered by a needle 44. This needle is provided with a hook 45 near its point, and the needle is carried by a holder 45ª, which is journaled on the shaft 29. The holder 45ª is provided with a rock arm 46 which, in turn, is pivotally connected, as at 47, to one end of a link 48. The other end of the link 48 is pivotally connected, as at 49, to one end of a lever 50. This lever is fulcrumed at its angle to a pivot 51 on the base 5. The lever 50 is provided with a short arm 52, which extends forwardly and under the main shaft 7, the other arm of the lever extending rearwardly over the main shaft 7, and thence downwardly to the pivot 51. Carried by the end of the short arm 52 of this lever is a roller 53, which engages in a cam groove 54 formed in a cam disk 55, which is fitted to the main shaft 7. It will be noted at this point that the position of the roller 53 is diametrically opposed to the position of the roller 36. The cam groove 37 of the awl actuating mechanism, and the cam groove 54 of the needle actuating mechanism, are of such shapes as to time the awl and the needle, whereby the awl will not leave the work until the point of the needle has entered the opening made by the awl. From the foregoing, it will be seen that the cam groove 54, will, through the roller 53, rock the lever 50, and this lever, through the link 48 and rock arm 46, oscillate the needle. The cam groove 54 is so shaped as to give the needle a period of rest while the awl is performing its feeding action.

Coöperating with the hooked needle is a rotary shuttle 56, which is mounted in a shuttle case 57 mounted on the bracket 10, and in a plane above the shaft 29, and also above the path of travel of the needle. This shuttle is rotated by means of a shaft 58 which is journaled in the bracket 10, and this shaft, in turn, carries a gear 59 which is driven by a gear 60 journaled on a shaft 61. Fixed to the gear 60 is a sprocket wheel 62, which is driven by a sprocket chain 63 from a sprocket wheel 64 fixed to the main shaft 7. Disposed within the shuttle is a bobbin 65. This bobbin is positioned within a seat 66 formed in the outer face of the shuttle. In order to provide a variable tension to the bobbin, and also to permit access thereto, I have provided a supporting rod 67 in the upper end of the bracket 10. This rod is held against oscillatory movements by a set screw 68. Rigidly secured to the rod 67 is a depending arm 69, having at its lower end an enlarged head 70'. Slidably mounted within this head is a pin 71 having its inner end rounded at 70 for engagement with the bobbin 65. This pin 71 is provided with a reduced extension 72 which extends outwardly through the head 70', and forms a resultant shoulder 73. An adjusting screw 74 surrounds the reduced end 72 and is threaded into the adjacent end of the head 70'. A coil spring 75 is disposed around the reduced end 72 and between the shoulder 73 and the adjusting screw 74. By adjusting the screw 74, more or less tension may be applied to the pin 71 and, consequently, to the bobbin 65. By releasing the set screw 68, the arm 69 carrying the pin 71 may be swung to the right or left and out of the plane of the bobbin 65, to permit ready access to said bobbin.

It will be noted that the axis of the shuttle shaft 58 is disposed in a plane parallel with the line of feed of the work. It will also be noted that the needle reciprocates in a vertical plane at one side of the shuttle, and that the axis of this needle reciprocation is parallel with the line of feed and with the shuttle shaft 58.

It will be noted that when the needle is in the work and is at the extreme low position, it becomes necessary for the hook 45 of the needle to engage the lower thread extending from the last stitch. To this end, I have provided a thread positioning device. This device consists of an upwardly extending finger 76, which is carried by a vertical shaft 77 journaled in the lower portion of the arm 12. The upper end of the finger 76 is provided with a thread eye 78, through which the lower thread extends from the supply to the last stitch. Secured to the upper end of the vertical shaft 77 is a bevel-gear 79, which meshes with a bevel-gear 80, fixed to a horizontal shaft 81, journaled in the bracket 10. Secured to the outer end of the shaft 81 is an arm 82, and to the free end of this arm is pivotally connected one end of a push rod 83. The end of the rod 83 is rigidly connected to another rod 84 by a coupling 85, and the rod 84 is slidably mounted in the upper end of a bracket 86. The rods 83 and 84 extend rearwardly and are normally held in their rearward position by a coil spring 87. Secured to one face of the cam disk 55 is a trip plate 88. This trip plate, during each cycle of movement, strikes the rod 84 and causes said rod 84 and rod 83 to be moved endwise in a forward direction against the tension of the spring 87. This movement causes the rock arm 82 to oscillate the shaft 81 and thereby oscillate the vertical shaft 77, together with the thread finger 76. The oscillation of this thread finger 76 causes the lower thread to be positioned relative to the needle, whereby the hook in the needle will, with certainty, engage said thread and lift the same upwardly in a loop-formation through the hole in the work.

In order to assist the positioning of this loop of thread which is being carried upwardly by the needle to the shuttle, I have provided a thread pick-up arm 89. This pick-up arm is trip-operated and moves in a vertical plane only. It is disposed in close proximity to the needle and the rear end thereof is fulcrumed, as at 90, to one end of an arm 91 which is secured by a bolt 92 to the bracket 10. The arm 89 extends forwardly from the pivot 90 over the shaft 61 and thence downwardly toward the shaft 29, and thence forwardly over said shaft, and terminates at a point directly above the throat plate 14. Fixedly secured to the shaft 61 is a trip-finger 93, which engages a downwardly extending shoulder 94, carried by the thread pick-up 89. As the shaft 61 revolves, the trip-finger 93 engages the shoulder 94 and swings the arm 89 upwardly so that the outer end thereof will be in a position between the needle 44 and the shuttle point. After the trip-finger 93 has passed beyond the shoulder 94, the thread pick-up arm 89 will return to its normal position through the action of a coil spring 95, which is connected at one end to the arm 91, and at its other end to the arm 89. After the needle 44 has moved upwardly and drawn the loop of thread therewith, the pick-up arm 89 is then timed to move upwardly and engage the strand of the loop adjacent the pick-up arm, and elevate said loop to a position above the needle. It will be noted, however, that the other strand of this loop is at this time still engaged with the notch 45 of the needle.

In order to further open this loop of thread and to position it relative to the shuttle, whereby the point of said shuttle will, with certainty, enter said loop, I have provided a thread hook 96, which moves in a horizontal plane only. One end of this hook is fulcrumed on the upper end of the bracket 11 by a screw 97, and the free end of this hook is provided with a notch 98 for engaging the thread. Adjacent the pivot 97 the hook is provided with a trip-finger 99, which is engaged by a trip arm 100 fixed to the shaft 61. A coil spring 101 serves to normally hold the hook in its inoperative position, and against a stop 102 fixed to the bracket 10. After the pick-up arm 89 has positioned the loop of thread in the manner previously described, the thread hook is swung laterally by the trip arm 100 and the trip finger 99, and is caused to engage the strand of thread held by the notch 45 of the needle 44, and thereby distend said loop and cause the same to be held open and in proper relation to the shuttle, whereby the point thereof will, with certainty, enter said loop.

The shuttle, in its revolution, picks up this loop, and the thread pick-up arm and the thread hook will then be automatically returned to their initial positions. The shuttle, of course, continues to carry this looper thread around the upper thread which extends from the bobbin, and during this movement of the loop, it necessarily passes under or between the bobbin and the tension pin 71 thereof.

In order to indent the work so as to provide a channel on the upper surface thereof for the reception of the thread, I have provided a trip-actuated indentor 103, which is provided with a substantially V-shaped end 104. This indentor is carried by a lever 105 fulcrumed on the shaft 61. This lever is positively operated by a trip-cam 106, and is automatically returned by a spring 107. The parts are so timed that the indentor performs its function while the feeding action of the work is at rest, and, of course, this indentor coöperates with the work support in order for the work to have sufficient rigidity.

In order to properly set the stitch, I have provided a controlling device for the lower thread, which includes an arm 108, which is pivoted at 109 to the base 5. The free end of this arm carries a thread eye 110, which, in turn, is carried by a shank 111. The shank 111 is slidably fitted into an opening formed in the free end of the arm 108. This sliding adjustment permits the thread eye 110 to be moved longitudinally of the arm 108, and thereby regulates the amount of pull-up to be given to the lower thread. The shank 111 may be held in adjusted position by a set screw 112. The arm 108 is provided with a rigid angular extension 113 which is engaged once during each cycle by a trip arm 114, which is mounted on the cam disk 43. The lower thread which passes through the thread eye 110 is thence led through a tension 115 to the source of supply. As the needle 44 moves upwardly and carries the loop of lower thread therewith, and while the thread pick-up arm 89 also moves upwardly to distend the loop of lower thread, the take-up arm 108 is moved upwardly by the action of the thread. After this loop of thread has been engaged by the shuttle and carried around to a point where it is about ready to pass under the bobbin tension pin 71, the trip plate 114 coöperates with the extension 113 and causes the arm 108 to be positively moved in a downward direction, thus not only forcing the loop of thread past the tension pin 71, and off the shuttle, but also serving to place sufficient tension on the thread to pull up the stitch just completed in a very tight manner.

Having thus described my invention, what I claim is:

1. In a lock stitch sewing machine, the combination of a work support, a reciprocatory awl operating from the under side of the work, a longitudinally tensioned shaft for supporting the awl, a notched needle operating from the upper side of the work, a cam operated lever engaging one end of the shaft to bodily move the shaft and awl to feed the work and to position the awl opening therein in line with the needle, a rotary shuttle disposed above the plane of the needle and rotating about an axis parallel with the direction of feed of the work, and means coöperating with the needle to engage the loop of thread carried thereby and position the same for entrance by the shuttle.

2. In a lock stitch sewing machine, the combination of a work support, a reciprocatory awl operating from the underside of the work, a longitudinally tensioned shaft for supporting the awl, a notched needle operating from the upper side of the work, a cam operated lever engaging one end of the shaft to bodily move the shaft and awl to feed the work and to position the awl opening therein in line with the needle, a rotary shuttle disposed above the plane of the needle and rotating about an axis parallel with the direction of feed of the work, and separate means disposed above and below the work support coöperating with the needle for respectively lifting and distending the loop of thread carried thereby for the entrance by the shuttle.

3. In a lock stitch sewing machine, the combination of a work support, a reciprocatory awl operating from the under side of the work, a longitudinally tensioned shaft for supporting the awl, a notched needle operating from the upper side of the work, a cam operated lever engaging one end of the shaft to bodily move the shaft and awl to feed the work and to position the awl opening therein in line with the needle, a rotary shuttle disposed above the plane of the needle, and means coöperating with the needle to engage the loop of thread carried thereby and position the same for entrance by the shuttle.

4. In a lock stitch sewing machine, the combination of a work support, a reciprocatory awl operating from the under side of the work, a longitudinally tensioned shaft for supporting the awl, a notched needle operating from the upper side of the work, a cam operated lever engaging one end of the shaft to bodily move the shaft and awl to feed the work and to position the awl opening therein in line with the needle, a rotary shuttle disposed above the plane of the needle and rotating about an axis parallel with the direction of feed of the work, an intermittently actuated pick-up arm coöperating with the needle to lift the loop of thread carried thereby to a plane above the needle, and an intermittently actuated thread hook for distending said loop of thread and positioning the same for the entrance by the shuttle.

5. In a lock stitch sewing machine, the combination of a work support, a reciprocatory awl operating from the under side of the work, a longitudinally tensioned shaft for supporting the awl, a notched needle operating from the upper side of the work, a cam operated lever engaging one end of the shaft to bodily move the shaft and awl to feed the work and to position the awl opening therein in line with the needle, a rotary shuttle disposed above the plane of the needle and rotating about an axis parallel with the direction of feed of the work, and separate means respectively operating in vertical and horizontal planes and coöperating with the needle for respectively lifting and distending the loop of thread carried thereby for the entrance by the shuttle.

6. In a lock stitch sewing machine, the combination of a work support, a reciprocatory awl operating from the under side of the work, a longitudinally tensioned shaft for supporting the awl, a notched needle operating from the upper side of the work, a cam operated lever engaging one end of the shaft to bodily move the shaft and awl to feed the work and to position the awl opening therein in line with the needle, a rotary shuttle disposed above the plane of the needle and rotating about an axis parallel with the direction of the feed of the work, a rotary shaft arranged in rear of and parallel with the line of feed of the work, means for driving said shaft, a driving connection between said shaft and said shuttle, and separate means coöperating with the needle and actuated by said rotary shaft for respectively lifting and distending the loop of thread carried thereby for the entrance by the shuttle.

7. In a lock stitch sewing machine, the combination of a work support, a reciprocatory awl operating from the under side of the work, a notched needle operating from the upper side of the work, means to bodily move the awl to feed the work and to position the awl opening therein in line with the needle, a rotary shuttle disposed above the plane of the needle and rotating about an axis parallel with the direction of the feed of the work, a rotary shaft arranged in rear of and parallel with the line of feed of the work, means for driving said shaft, a driving connection between said shaft and said shuttle, a pick-up arm fulcrumed to swing in a vertical plane to coöperate with the needle to lift the loop of thread carried thereby to a plane above the needle, a thread hook pivoted for swinging movements in a horizontal plane for distending said loop of thread lifted by said pick-up arm and positioning said thread for the entrance by the shuttle, and means carried by said rotary shaft for intermittently operating said pick-up arm and thread hook in succession.

8. In a lock stitch sewing machine, the combination of a work support, a longitudinally tensioned horizontal supporting shaft disposed in rear of said work support, a needle holder fulcrumed on said shaft and carrying a notched needle, said needle entering the work from the upper side thereof, an awl fulcrumed on said shaft and operating from the under side of the work, a cam operated lever engaging one end of the shaft to bodily move the shaft and awl in a general direction parallel with the axis of said shaft to feed the work and to position the awl opening therein in line with the needle, and a rotary shuttle rotating about an axis arranged above the plane of the needle and parallel with the direction of feed of the work.

9. In a lock stitch sewing machine, the combination of a shuttle support, a rotary shuttle mounted therein, a bobbin disposed within the shuttle, a supporting rod journaled in the shuttle support, means to lock said supporting rod against movement, an arm depending from said supporting rod, and yieldable means carried by said depending arm and engaging said bobbin to tension the same.

10. In a lock stitch sewing machine, the combination of a shuttle support, a rotary shuttle mounted therein, a bobbin disposed within the shuttle, a supporting rod journaled in the shuttle support, means to lock said supporting rod against movement, an arm depending from said supporting rod, a head carried by the lower end of said depending arm, a pin mounted in said head for endwise movement, and normally bearing against the bobbin, a spring within the head for exerting a yieldable pressure of the pin against the bobbin, and means for varying the tension of said spring.

11. In a lock stitch sewing machine, the combination of a shuttle support, a shuttle journaled in said support, a bobbin disposed within the shuttle, and a depending arm mounted on said shuttle support and carrying a tensioning means for the bobbin, said depending arm being mounted for swinging movements to provide access to the bobbin.

12. In a lock stitch sewing machine, the combination of a work support, a stitch forming mechanism, including a notched needle, means for reciprocating said needle, and a thread positioning lever having an upwardly arched intermediate cam operated portion mounted for oscillatory movements about a horizontal axis to position the thread in coöperative relation to the needle.

13. In a lock stitch sewing machine, the combination of a work support, a stitch forming mechanism, including a notched needle, means for reciprocating said needle, a thread positioning device mounted for oscillatory movements about a vertical axis to position the thread in coöperative relation to the needle, a bevel-gear movable with said positioning device, a bevel-gear oscillating about a horizontal axis and arranged in mesh with the first mentioned gear, a rock arm movable with said second mentioned bevel gear, yieldable means for normally holding said rock arm in its inoperative position, and intermittent means coöperating with said rock arm for actuating the same against the tension of said yieldable means.

RAYMOND H. RUDOLPH.

Witnesses:
CHAS. C. TILLMAN,
ANNA BLOMQUIST.